Figure 7:
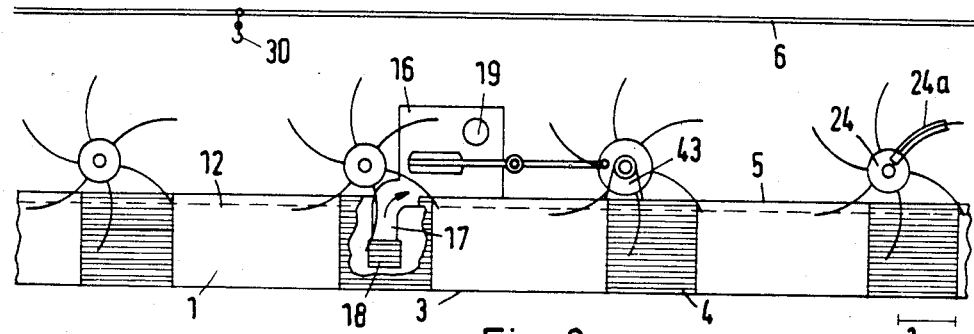

United States Patent [19]

Jöst

[11] Patent Number: 4,511,808
[45] Date of Patent: Apr. 16, 1985

[54] INSTALLATION FOR EXPLOITING WATER CURRENTS IN FLOWING WATERS BY MEANS OF A PLURALITY OF WATER WHEELS

[76] Inventor: Bernhard Jöst, Traminerweg, 4, D-6800 Mannheim, Fed. Rep. of Germany

[21] Appl. No.: 385,412

[22] PCT Filed: Sep. 12, 1981

[86] PCT No.: PCT/DE81/00141
§ 371 Date: May 17, 1982
§ 102(e) Date: May 17, 1982

[87] PCT Pub. No.: WO82/01038
PCT Pub. Date: Apr. 1, 1982

[30] Foreign Application Priority Data

Sep. 16, 1980 [DE] Fed. Rep. of Germany ...... 3034862

[51] Int. Cl.³ ............................................. F03B 7/00
[52] U.S. Cl. ..................................... 290/54; 415/7; 416/84; 417/334
[58] Field of Search .................. 290/43, 54; 417/334–337; 416/84–86; 415/7

[56] References Cited

U.S. PATENT DOCUMENTS

| 390,136 | 9/1888 | Owen | 417/334 |
|---|---|---|---|
| 441,183 | 11/1890 | Mather | 417/334 |
| 988,508 | 4/1911 | Reynolds | 290/42 |
| 1,074,292 | 9/1913 | Reynolds | 416/86 |
| 1,368,454 | 2/1921 | Rebman | 416/85 |
| 3,928,771 | 12/1975 | Straunses | 290/54 |
| 4,352,990 | 10/1982 | Aucoin, Jr. | 290/54 |

Primary Examiner—S. J. Witkowski
Assistant Examiner—Shelley Wade
Attorney, Agent, or Firm—Collard, Roe & Galgano

[57] ABSTRACT

An installation for exploiting the energy of flowing water in a river stream comprising a plurality of anchored pontoons supporting a plurality of waterwheels; the pontoons being arranged in a plurality of rows, the pontoons in each row being in tandem such that they form a multiplicity of longitudinal channels to channel water flow from the front to the rear of the installation and a plurality of transverse channels to channel water flow from the side of the installation to its center; the waterwheels having crankshafts that drive double acting piston pumps.

8 Claims, 24 Drawing Figures

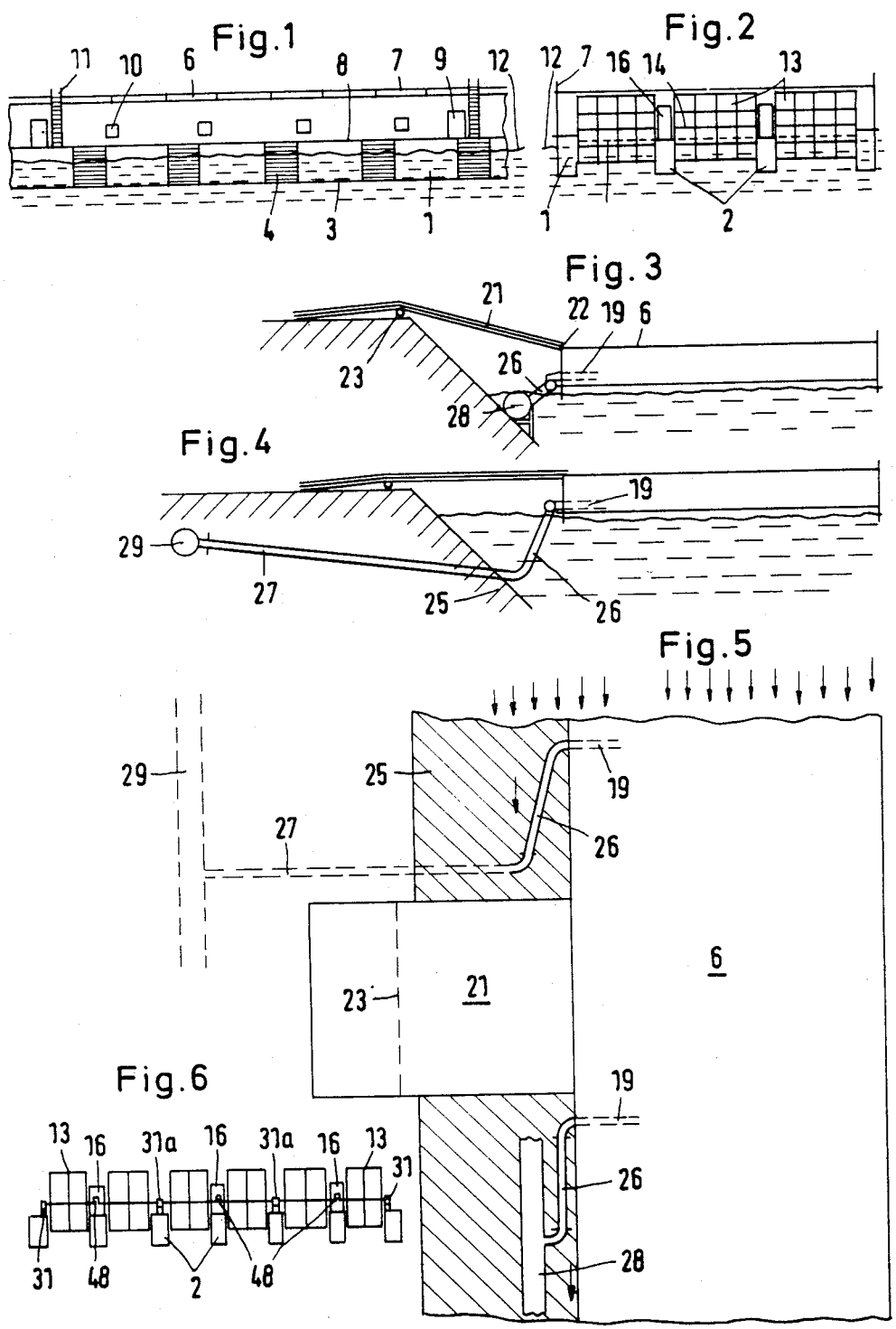

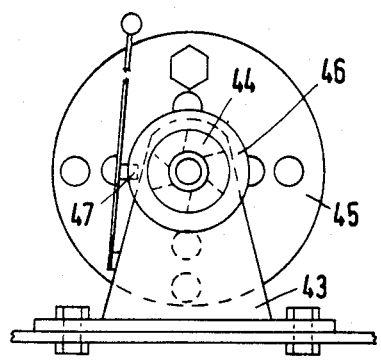
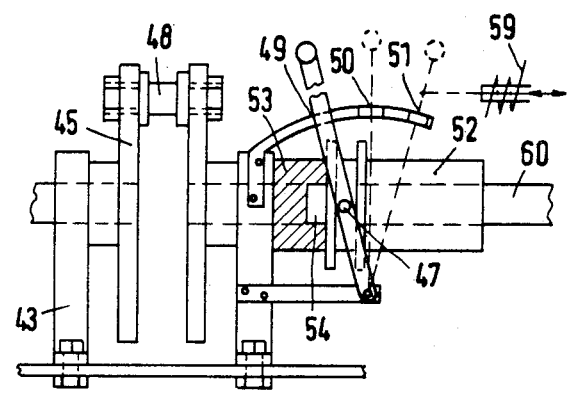
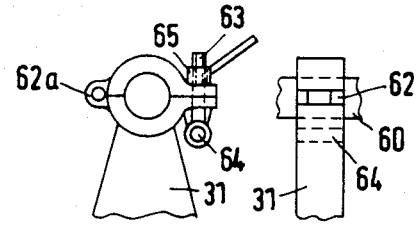
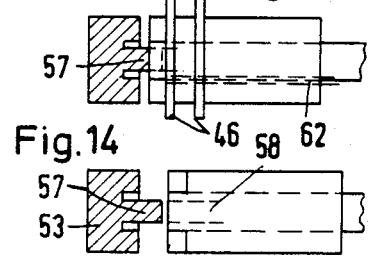
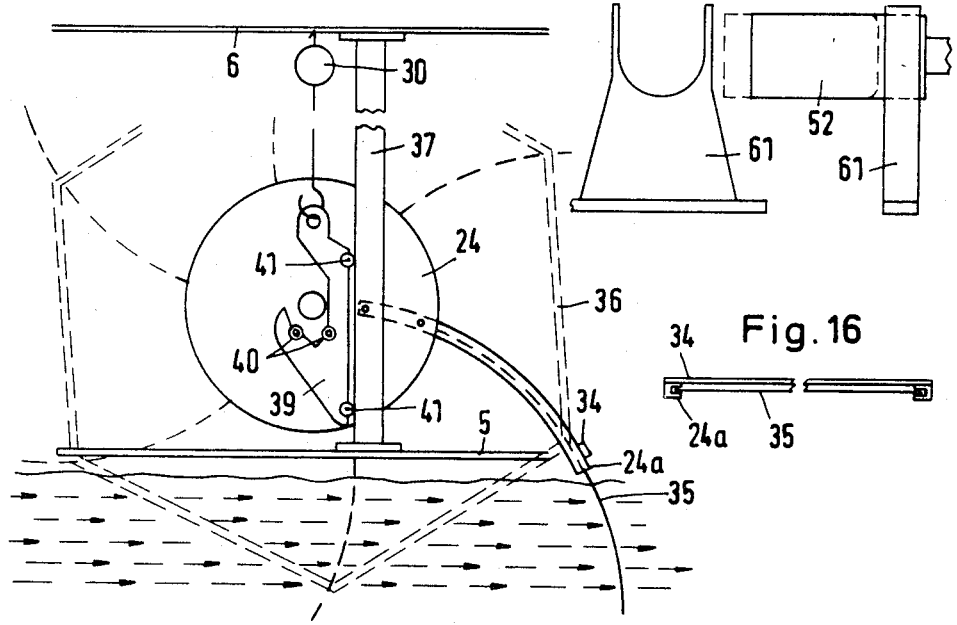

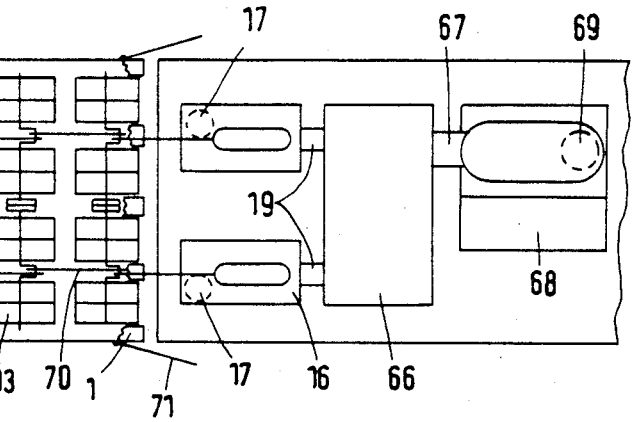
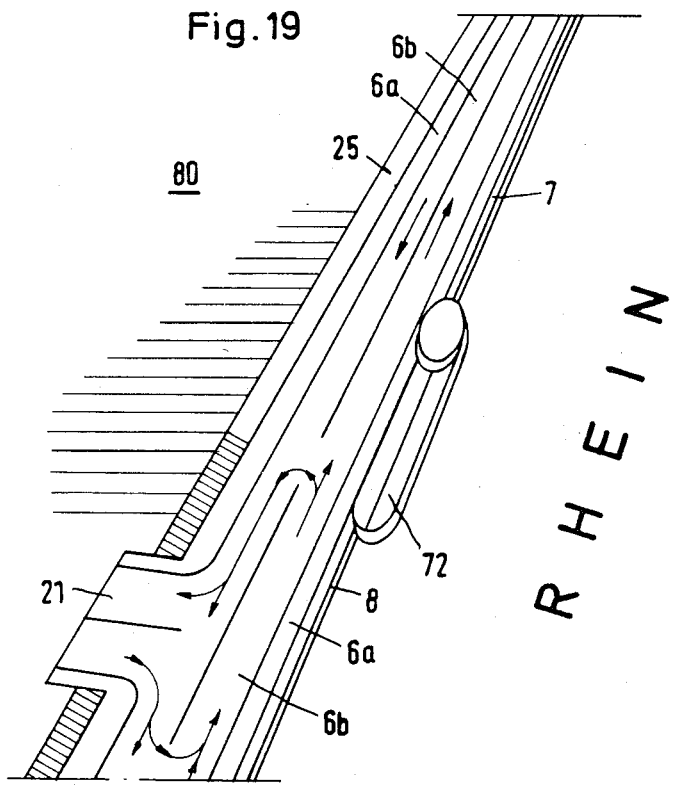

INSTALLATION FOR EXPLOITING WATER CURRENTS IN FLOWING WATERS BY MEANS OF A PLURALITY OF WATER WHEELS

The invention relates to an installation for exploiting water currents in flowing waters by means of a plurality of water wheels which absorb the movement energy of the flowing water and convert it into a different form of energy, for example, electric energy.

The subject invention is suitable to recover energy in the most simple way without the consumption of raw materials and without polluting the environment. Furthermore, no valuable land should be wasted for large energy recovery installations, just the contrary, additional land should be generated along polluted and hitherto useless river banks in form of pedestrian and bicycle paths.

Water wheels are used for centuries as a drive force. In the last century many tests were performed for driving a plurality of water wheels successively in sheet metal or concrete channels, so as to generate large quantities of energy.

However, for various reasons no progress was made. When water wheels are positioned successively in a channel which is closed on the bottom and on the sides only the foremost wheel receives the full water force. This slows the flow of water during stress, so that the following water wheel does not receive enough flow and water mass. Furthermore, the slowed down flow seeks a way around the channel and is lost for the drive.

It is an object of the invention to provide a device which enables an optimum use of the energy of the flowing water.

To obtain the object, a device of the aforementioned type is suggested which is characterized in that the drive of the water wheel is connected with a pump which sucks water through a suction socket and feeds it through a pressure line to a pressure tank which is connected by means of a pressure line to a turbine generator.

In order to prevent a deflection of the water, a plurality of water wheels are positioned adjacent with respect to each other and, if need be, a plurality of water wheel groups are successively mounted on pontoons. In order to fill the vacuum generated behind the water wheels as rapidly as possible and to maintain the flow, no bottom part should prevent the flow from below the wheels. The water wheels must be suspended as freely as possible in the flow.

Furthermore, the support platoons between the water wheels should have a sufficient distance from each other in the longitudinal direction, so that the larger outer flow can also flow through the inner part of the total device.

All previous tests to drive transmissions of smaller power generators by means of water wheels had to fail. They require a number of revolutions of at least 500/per minute. However, a usable water wheel provides only about 5 number of revolutions per minute. If a belt disk is used for the power generator of 10 cm $\phi$, the drive disk would have to have a diameter of 10 m. Such a transmission ratio is not productive even with a stepwise operation. For this reason, the recovery of energy through water wheels is only possible by an intermediary switching of double efficient large volume pumps, whereby the slow stroke speed corresponds to the number of rotation of the water wheels. The pumps have a very good degree of efficiency and can drive the largest turbines in any given number commonly through a pressure line.

In order to produce such power plants in any shape and for any purpose, the production in the mechanical assembly technique is recommended. Between 30,100 or even more water wheels are mass produced in the shipyard and are transported on the water way to the operational site where the different units can be coupled with each other as desired.

Furthermore, the installation can be so constructed that the power transmission of a plurality of water wheels is performed by means of driving rods from water wheel to water wheel and at a connecting unit. With this embodiment relatively few support platoons are required, so that all water wheels are very well suspended in the flow.

It is further possible to provide pumps, water lines, pressure tank and power generator in a closed ship body, whereby the water wheels and pump form one unit. Thereby, so many units may be coupled with each other that the energy is transmitted to the turbine generators by means of collecting lines on platoons or collecting lines on land.

Furthermore, deflecting grates may be provided as a tip for each row of installations for deflecting drift goods and drift ice. Furthermore, the ship body may contain machines for making hydrogen and oxygen as an energy replacement. Furthermore, pumps may be provided which are designed as air pumps which pump air (oxygen) to the bottom of the river for regeneration purposes.

Furthermore, pumps and a drinking water preparation installation may be provided on a ship or pontoon body which can be driven by a given unit, whereby a remote water supply and also a land irrigation system can be constructed, for example.

Furthermore, floating dredges may be driven in the ship body in form of bucket chains or suction dredges, whereby a location change can be provided in the center of the river on anchored rope winches, either upstream or downstream.

The units on the pontoons may be designed in a reduced bridge structure, whereby all units have a stable roof with a suitable cover for a bicycle or pedestrian path.

The inventive installation is advantageous in that it enables an energy recovery without environmental stress, whereby the banks of the rivers are improved and a friendly landscape is created.

In conjunction with the drawings, the inventive installation will be explained, for example, by means of preferred embodiments.

The drawings show

Figure 8:
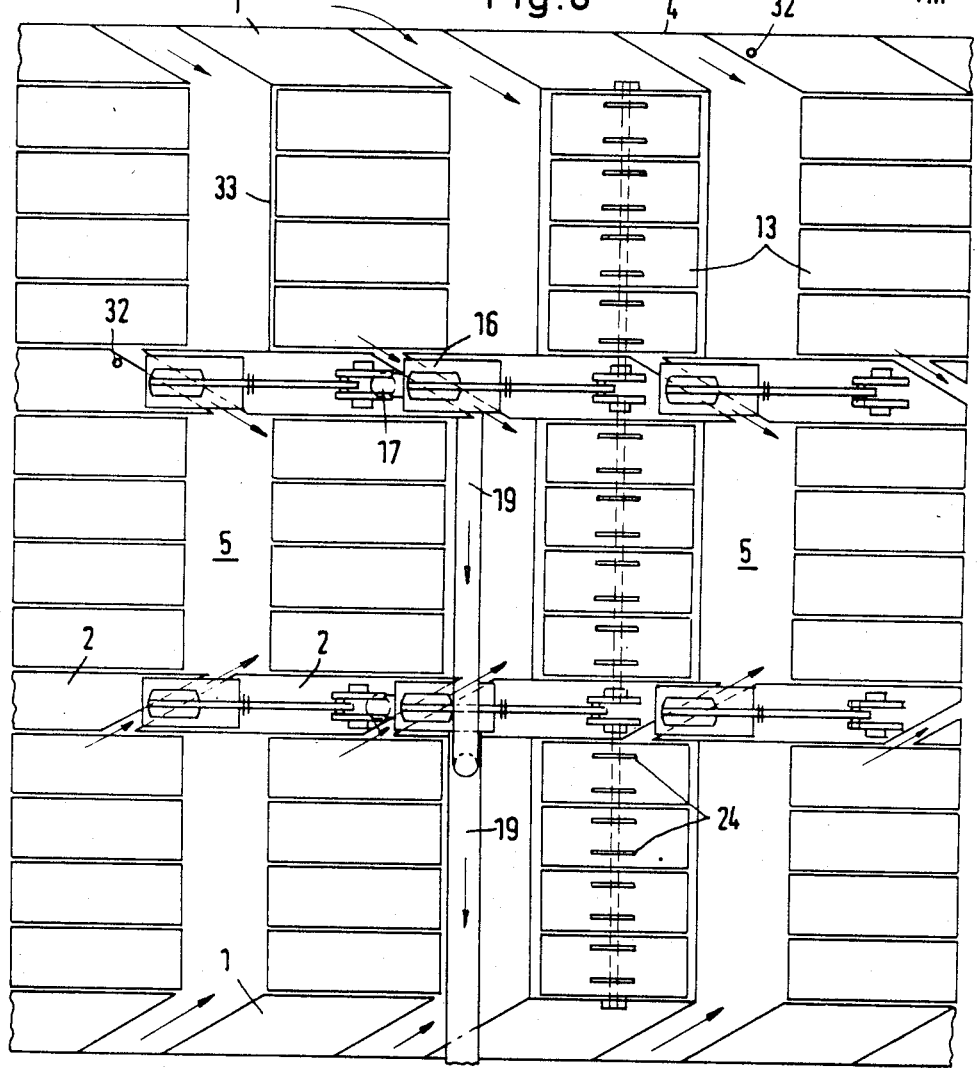
Figure 20:
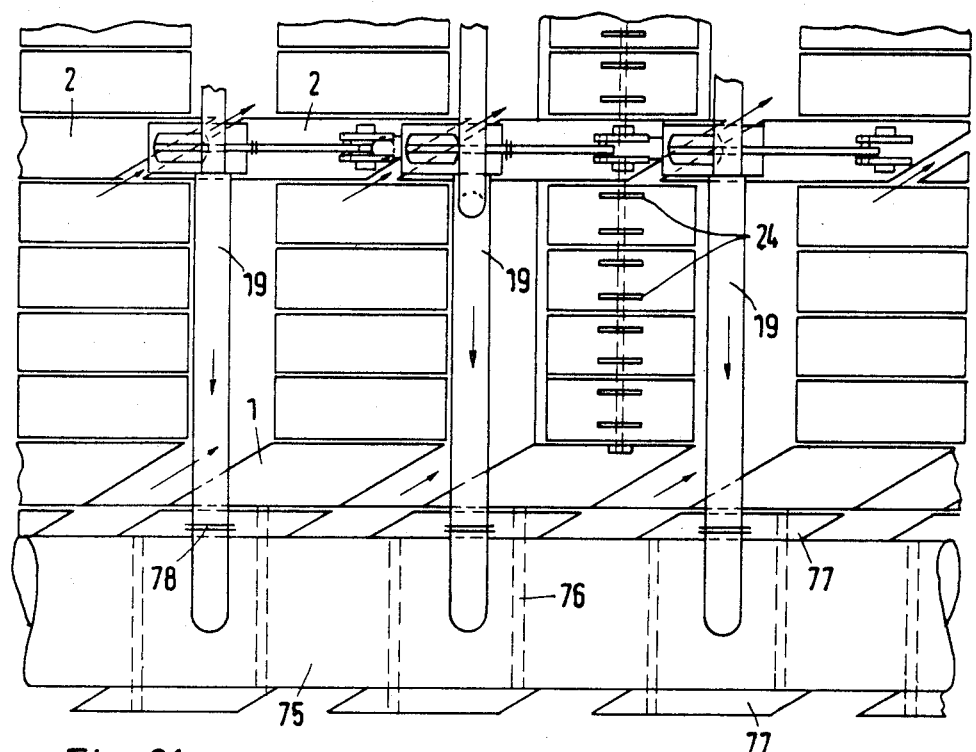
Figure 21:
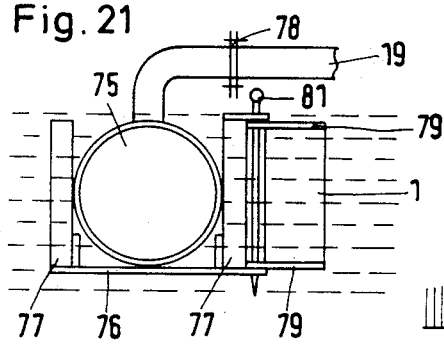
Figure 22:
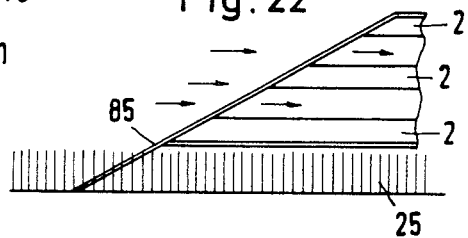
Figure 23:
Figure 24:
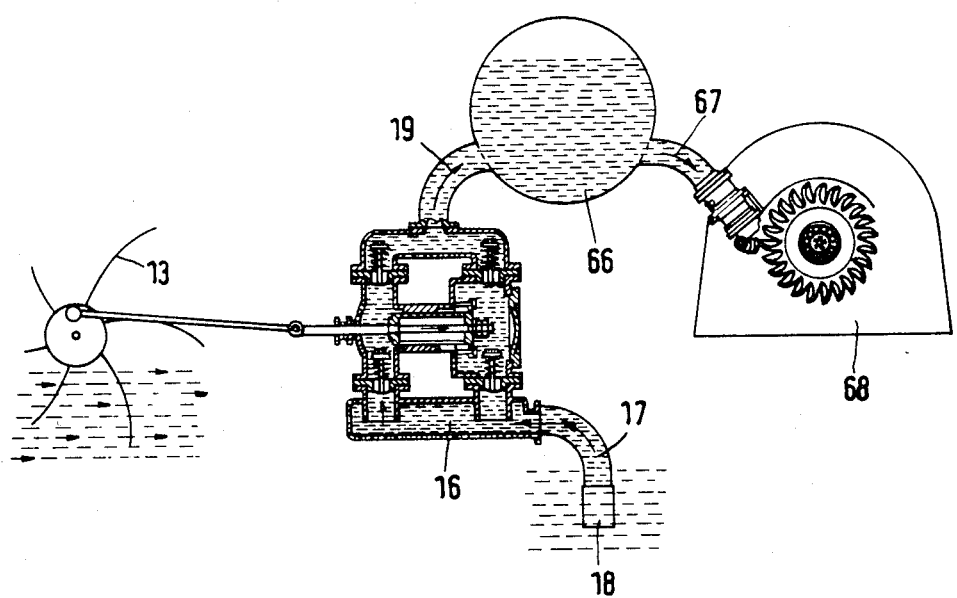

FIG. 1. a partial view of the installation seen from the bank,

FIG. 2 a sectional view of the installation in accordance with FIG. 1,

FIG. 3 an installation seen in flow direction with a moveable bridge,

FIG. 4 an installation in accordance with FIG. 3, however at a high water level, FIG. 5 a partial view of the installation from above with a bridge for bicyclists and pedestrians, FIG. 6 a view in accordance with FIG. 2, however in a different grouping of the individual elements, FIG. 7 the side view of the machine chamber of the installation in accordance with the invention, FIG. 8 a plan view on the machine chamber in accordance with FIG. 7, FIG. 9 a bearing block with crank disk, FIG. 10 a bearing block without clutch, FIG. 11 a device for lifting the water wheels with the axle, FIG. 12 a crank shaft with pawl clutch, FIG. 13 a clutch in switched position 50 in accordance with FIG. 12 (idle running), FIG. 14 the clutch in switch position 51, in accordance with FIG. 12, FIG. 15 an alternative solution in place of FIGS. 13 and 14,

FIG. 16 a blade,

FIGS. 17 and 18 plan views onto partial units of the installation in accordance with the invention, FIG. 19 the arrangement of the installation on a river bank, FIG. 20 a portion of FIG. 8, FIG. 21 a collecting pipe in a section seen from the side, FIG. 22 a deflecting grate on the pontoons, FIG. 23 a deflecting grate in accordance with FIG. 22, seen from the center of the river, FIG. 24 the installation for generating power in its principle structure.

The installation will be explained in its principle in accordance with the invention in conjunction with FIG. 24.

The installation consists of a water wheel 13, a pump 16, a suction pipe 17 which is connected with a suction pipe basket 18. The pressure line 19 leads from the pump 16 to the pressure tank 66 which is connected, by means of a pressure pipe 67, with the turbine generator 68.

The relatively slow moving water wheel 13 drives pump 16 which operates as a double acting piston pump whose stroke and number of rotation corresponds to the one of the water wheel. The pump pushes the water through the pressure tank with the highest pressure to the turbine generator, so that correspondingly very high fall heights are achieved.

The partial view of the installation shown in FIG. 1 shows side pontoons 1 which are connected with a connecting bar 3, whereby a water inlet grate 4 is provided. The numeral reference 6 designates the ceiling of the machine chamber which is limited by a bannister 7, whereby a bottom 5 limits the machine chamber on the lower side, and that a door 9 leads to the outer running board 8 and a ladder 11. The water level is designated with the reference numeral 12.

FIG. 2 shows the installation of FIG. 1, seen in flow direction and in section, whereby the water wheels 13 are positioned adjacent to each other and the reference numeral 2 represents the inner pontoon and reference numeral 5 the bottom of the machine chamber. The axle 14 of the water wheels 13 is associated with the pump 16 in a suitable manner.

FIG. 3, the movable bridge with the bannister to the ceiling 6 of the machine chamber is shown, whereby the pivot point of the bridge is at 22 and the bridge joint 23 moves on rollers. The part of the pressure line 19 runs through a connecting high pressure hose to a collecting line 28, to the turbine and to the slope of the bank.

FIG. 4 shows the same arrangement only at a high water level. Furthermore, the collecting line to the turbine is alternatively provided toward the inland. For this purpose a connecting pipe 27 to the collecting pipe 29 is provided which extends through the slope 25.

FIG. 5 shows a plan view of the installation in accordance with FIGS. 3 and 4, whereby the bridge 21 together with the ceiling 6 of the machine chamber is visible.

While in FIG. 2, the axles 14 of the water wheels 13 are continuously connected with each other, another grouping is advantageous because of the different flow between the inner and outer water wheels, so that the faster running water wheels are not slowed down by the slow running water wheels.

FIG. 6 shows one of the many grouping possibilities. Here, only four water wheels are operating on one pump, whereby the water wheels 13 are provided between the inner pontoons 2 with the corresponding distance from pumps 16 between the outer supports 31 and the separated double supports 31a. The crank shafts are designated with the reference numeral 48.

The side views and plan views of the machine chamber illustrated in FIGS. 7 and 8 show the outer pontoons 1, the connecting bar 3 for the pontoons and the water inlet grate, the bottom 5 of the machine chamber, the ceiling 6, the guide rails for a lift, whereby the double acting pump 16 is connected with a discharging pressure line 19 by means of the suction basket and the suction socket 17. For the wheel blade insert, disks are provided on the axle for receiving U-tracks. The reference numeral 24a depicts an U-track, 30 an electrical lift, 43 a bearing block. Furthermore, a protective railing 33 is provided on all moveable parts.

In FIG. 9, a bearing block 43 is provided with a crank disk 45 (crank plate) with a plurality of bores in different distances with respect to the crank axis. By displacing the crank pin 48 into an inner or outer bore, the most favorable piston stroke can be determined. During constant conditions, normal piston pumps may be used. Furthermore, the bearing block 43 is provided with a pawl clutch 44, disks 46 for the clutch stroke and a roller 47 on the switch lever between the two disks.

FIG. 10 shows the bearing block 31 without the clutch for the outer ends of the water wheel axes. For a more rapid assembly and disassembly, bearing covers are provided with hinges 62a and a pivot bolt 63 with a joint 64 and a nut 65 acting as a rapid locking means. The water wheel axle is designated with the reference numeral 60.

FIG. 11 shows a device for lifting the water wheels with the axle from the flowing water. The ceiling supports 37 are advantageously so mounted that they serve as an abutment for this device. The rotating axle of the water wheel is lifted with an electro pull 30, a hook 39 with rollers 40. Rollers 41 serve to catch the water pressure onto the water wheel axle. Disk 24 serves for mounting the U-tracks 24a, whereby ribs 34 are mounted behind the wheel blades 35 and ribs 36 between the U-tracks.

The crank shaft with the pawl coupling illustrated in FIG. 12 comprises the bearing block 43, a crank plate 45, a roller 47 on the switch lever, crank pin 48, locking means 49 for the switch lever in operating position. In the idle running (position 50) the pump is decoupled. The locking position 51 serves for an unhindered removal or insertion of the water wheel axle, whereby the part 52 slides onto a wedge of the pawl clutch, whereby the part 53 of the pawl clutch is fixedly connected with the crank shaft and the pawl 54 of the sliding part is engaged. The pawl 59 can also be equipped with a magnet or motor actuation.

FIG. 13 shows the clutch in switched position 50 (idle running), whereby the pin still engages bore 58 of the axle 60. The reference numeral 46 designates shift plates and with reference numeral 62 a groove with a wedge in the shaft is illustrated.

FIG. 14 shows the clutch in the switch position 51, whereby the water wheel axle in the shift part of the pawl clutch is free for disassembly.

FIG. 15 shows an alternative solution of FIGS. 13, 14. Instead of the guide pin a second bearing is provided adjacent to bearing block 43, so that the clutch box with the water wheel axis is already supported by this second bearing in the switch position 50 (FIG. 12) and that the pump is in the rest position for maintenance purposes. The bearing block for the second bearing is designated with the reference numeral 61.

FIG. 16 shows the bucket blade 35 which is inserted behind the bucket blade in a U-track 24a with a rib 34. The bucket blade may consist of plastic or non-rusting material.

FIGS. 17 and 18 show partial views of the installation in accordance with the invention, whereby FIG. 17 represents a group of four water wheels 13 on a crank shaft 14. The groups which are mounted successively in the flow direction in always the same strong current are connected with each other by connecting rods 70. The transposing of the pumps and the pipe lines to the next connecting unit saves weight and therefore the number of pontoons is less, whereby more water wheels are suspended more favorably in the flow. The connecting part between the drive unit and the unit shown in FIG. 18 is designated with the reference numeral 71.

This unit is heavily loaded by the pumps 16 with the suction socket 17, the pressure tank and the turbine generator 68, so that pontoons are not suitable as supports, whereby closed ship bodies can be used. On this unit, the pressure pipes 19, the pressure tank 66 and the connecting pipe 67 to the turbine generator 68 are mounted. The turbine discharge is designated with the reference numeral 69.

FIG. 19 shows the arrangement on the banks of a river whereby reference numeral 80 designates the right river bank. The ceilings of the machine chambers of all units are covered with a suitable cover and are connected to a bicycle and pedestrian path 6b or 6a, which remains free of ice and snow in the winter due to its own heat and an eventual additional heating. The path is limited by a railing 7. The reference numeral 8 designates the outer running board. The bridge 21 which automatically adjusts to the water movement serves as an access and exit. The reference numeral 72 designates a ship which has been tight to its mooring.

FIG. 20 shows a part of FIG. 8 which is connected with a collecting line 75 mounted on pontoons. The pontoons 77 are connected with connecting parts 76. The reference numeral 78 designates the flanges of the pressure pipes. In this unit combination the pressure and collecting pipes can be rigidly connected with each other without intermediary hoses. Also, a plurality of collecting pipes can be mounted with each other which advantageously are arranged at the bank side, because less drive force is getting lost due to the lower flow.

FIG. 21 shows a collecting line or a collecting pipe 75 which is or are connected with the pressure line 19 with the connecting flanges 78. The reference numeral 1 designates an outer pontoon (FIG. 8), whereby the connecting part 76 for the pontoons 77 is mounted below the collecting pipe 75. Flanges 79 with bores are provided on the pontoons which are connected by means of rods 81 with the flanges of the pontoons 77.

The deflection grates 85 shown in FIG. 22 are mounted at the flow in side of each installation so as to deflect floating articles and drifting ice away from the installation.

FIG. 23 shows the deflection grate in accordance with FIG. 22, seen from the center of the river.

I claim:

1. In an installation for exploiting the energy of flowing water in a river stream of the type including a plurality of anchored pontoons, a plurality of water wheels mounted between said anchored pontoons and disposed in adjacent and successive rows, a plurality of generators having drive turbines and a plurality of piston pumps by which said water wheels drive said turbines of said generators, the improvement comprising:

said anchored pontoons including a plurality of pontoons disposed in outer and intermediate lateral rows, the pontoons in each row being arranged in tandem and so shaped with spacings therebetween and between adjacent rows to form a multiplicity of longitudinal channels to channel water flow from the front to the rear of the installation and a plurality of transverse channels to channel water flow from the side of the installation to its center so as to hinder water flow as little as possible, the installation being free of floor or lateral limitations disposed between respective outer pontoons and intermediate pontoons; and said water wheels disposed in tandem having crankshafts connected to each other by connecting rods which, in turn, drive said double acting piston pumps, said piston pumps being slow running and having a relatively large stroke for drawing in river water and pumping said water through high pressure lines to pressure storage means, said pressure storage means communicating through pressure conduits to the turbine of a turbo-generator.

2. The installation of claim 1, wherein said river includes a slope and said pressure lines extend from said pumps by means of connecting high pressure hoses through a collecting line to a turbine arranged at the slope.

3. The installation of claim 1, wherein said pressure lines connected to said pumps extend to a collecting line for the turbine by means of connecting hoses and connecting pipes.

4. The installation of claim 1, wherein said pressure lines extend to at least one rigid collecting line mounted on pontoons connected with the turbine.

5. The installation of claim 1, wherein the pontoons are provided with a continuous ceiling and bridges with bridge joints for walking or driving theron with small vehicles.

6. The installation of claim 1, wherein said pontoons comprise outer pontoons connected with center pontoons by means of connecting bars for pontoons and water grates, wherein said water wheels are positioned between an outer and a center pontoon and between said center pontoons, and wherein suction elements for the suction socket of said pumps are positioned therebetween.

7. The installation of claim 1, wherein a plurality of pontoon units is designed as an artificial bank installation along the river banks which can be walked on.

8. In an installation for exploiting the energy of flowing water in a river stream of the type including a plurality of anchored pontoons, a plurality of water wheels mounted between said anchored pontoons and disposed in adjacent and successive rows, a plurality of generators having drive turbines and a plurality of piston pumps by which said water wheels drive said turbines of said generators, the improvement comprising:

said anchored pontoons including a plurality of pontoons disposed in outer and intermediate lateral rows, the pontoons in each row being arranged in tandem and so shaped with spacings therebetween and between adjacent rows to form a multiplicity of longitudinal channels to channel water flow from the front to the rear of the installation and a plurality of transverse channels to channel water flow from the side of the installation to its center so as to hinder water flow as little as possible, the installation being free of floor or lateral limitations disposed between respective outer pontoons and intermediate pontoons; and said water wheels disposed in tandem having crankshafts connected to each other by connecting rods which, in turn, drive said double acting piston pumps, said piston pumps being slow running and having a particularly large stroke for drawing in river water and pumping said water through high pressure lines to pressure storage means, said pressure storage means communicating through pressure conduits to the turbine of a turbo-generator; and a multiplicity of auxiliary channels formed between each adjacent pair of longitudinal channels to channel water flow from the respective outermost channel to the innermost channel of said adjacent pair of channels.

* * * * *